United States Patent
Ota

(10) Patent No.: US 7,496,276 B2
(45) Date of Patent: Feb. 24, 2009

(54) TELEVISION BROADCAST SIGNAL RECEIVING APPARATUS

(75) Inventor: Hideyuki Ota, Saitama (JP)

(73) Assignee: Sony Corporation, Tokyo (JP)

( * ) Notice: Subject to any disclaimer, the term of this patent is extended or adjusted under 35 U.S.C. 154(b) by 695 days.

(21) Appl. No.: 10/552,256

(22) PCT Filed: Apr. 6, 2004

(86) PCT No.: PCT/JP2004/004967

§ 371 (c)(1),
(2), (4) Date: Oct. 5, 2005

(87) PCT Pub. No.: WO2005/077378

PCT Pub. Date: Aug. 25, 2005

(65) Prior Publication Data

US 2006/0262228 A1    Nov. 23, 2006

(51) Int. Cl.
*H04N 7/00*    (2006.01)
*H04N 5/91*    (2006.01)

(52) U.S. Cl. .......................................... 386/83; 386/46

(58) Field of Classification Search .................. 386/46, 386/83, 124, 125, 52
See application file for complete search history.

(56) References Cited

U.S. PATENT DOCUMENTS 4,879,611 A    11/1989 Fukui et al.

FOREIGN PATENT DOCUMENTS

| CA | 1 322 788 | 7/1987 |
|---|---|---|
| EP | 0 118 104 | 9/1984 |
| EP | 0 255 107 | 2/1988 |
| EP | 0 255 108 | 10/1992 |
| EP | 0 724 360 | 7/1996 |
| JP | 59 229929 | 12/1984 |
| JP | 63-38376 | 2/1988 |
| JP | 63-50233 | 3/1988 |
| JP | 1-245772 | 9/1989 |
| JP | 405284477 A | * 10/1993 |
| JP | 406233261 A | * 8/1994 |
| JP | 406233262 A | * 8/1994 |
| JP | 7 225985 | 8/1995 |
| JP | 11-164267 | 6/1999 |
| JP | 2000-50216 | 2/2000 |
| JP | 2000-270288 | 9/2000 |
| WO | WO 01 95616 | 12/2001 |

OTHER PUBLICATIONS

Patent Abstracts of Japan, publication No. 61285879 dated Dec. 16, 1986.
Patent Abstract of Australia; Publication No. 76254/87; Publication Date Feb. 4, 1988.

* cited by examiner

*Primary Examiner*—Robert Chevalier
(74) *Attorney, Agent, or Firm*—Frommer Lawrence & Haug LLP; William S. Frommer

(57) ABSTRACT

The present invention is directed to an apparatus in which recording reservation is registered by using a VPS/PDC signal and at the same time, a television broadcast program can be viewed even within the time window. Consequently, in a television broadcast signal receiving apparatus in which a television broadcast signal superimposed with broadcast start time as teletext data (VPS/PDC signal) is made possible to be recorded by reservation, a reservation recording which uses the VPS/PDC signal is registered and at the same time, channel scan off means 2a for turning off the channel scan when the state is in the time window is provided.

5 Claims, 3 Drawing Sheets

TELEVISION BROADCAST SIGNAL RECEIVING APPARATUS

TECHNICAL FIELD

The present invention relates to a disc recorder in which it is made possible to record by reservation a television broadcast signal superimposed with a broadcast start time as teletext data (VPS (Video Programme System)/PDC (Programme Delivery Control) signal).

BACKGROUND ART

In the past, centering on Europe, a disc recorder has been proposed in which it is made possible to record by reservation a television broadcast signal superimposed with a broadcast start time as teletext data (VPS/PDC signal).

The VPS/PDC signal which is broadcast start time information is superimposed in every field of a television broadcast signal and even if the recording reserved program is shifted for its broadcast start time depending on some sort of causes such as a special newscast, it is possible to record an aimed program when recording by reservation using this VPS/PDC signal, because the recording is carried out in dependence upon the broadcast start time of this VPS/PDC signal.

DISCLOSURE OF THE INVENTION

However, in a case when a recording reservation is carried out by using the VPS/PDC signal for a disc recorder of a single tuner in which only one television tuner is contained, the VPS/PDC signal is detected by selecting an object channel for the reservation recording, for example, channel 6 within the time window at every predetermined time (hereinafter, named as channel scan) and it is judged whether or not the execution of the recording is possible.

In a case when a reservation, for example, starting from 0:00 until 3:59 on March 24 is registered as a recording reservation, it is constituted such that the time window is set from 20:00 on March 23 until 4:00 on March 25 and during that period, the channel selection of the reservation object channel (channel scan) is to be carried out.

Also, in a case when a reservation, for example, starting from 4:00 until 23:59 on March 24 is registered as a recording reservation, it is constituted such that the time window is set from 0:00 on March 24 until 4:00 on March 25 and during that period, the channel scan is to be carried out.

Consequently, there was an inconvenience in a disc recorder of a single tuner in the past that it is not possible to view the television broadcast during the time window period when there is set a recording reservation using the VPS/PDC signal.

In view of such an aspect, the present invention is directed to make it possible to view a television broadcast program even within a time window after a recording reservation is registered by using the VPS/PDC signal.

The television broadcast receiving apparatus of the present invention is an apparatus in a television broadcast receiving apparatus which makes it possible to record by reservation a television broadcast signal superimposed with a broadcast start time as teletext data (VPS/PDC signal), wherein a reservation recording using the VPS/PDC signal is registered and at the same time, channel scan off means for turning off the channel scan when the state is in a time window is provided.

Generally, a reservation recording using the VPS/PDC signal is registered and at the same time, a channel scan is carried out when the state is in the time window such that it is not possible to view a television broadcast program, but according to the present invention, there is provided channel scan off means for turning off the channel scan at that time, so that it is possible also at that time to view a television broadcast program of a desired channel in response to a user's demand.

BEST MODE FOR CARRYING OUT THE INVENTION

Hereinafter, it will be explained with respect to best mode examples for carrying out the television broadcast receiving apparatus of the present invention with reference to FIGS. 1 to 3.

Figure 1:
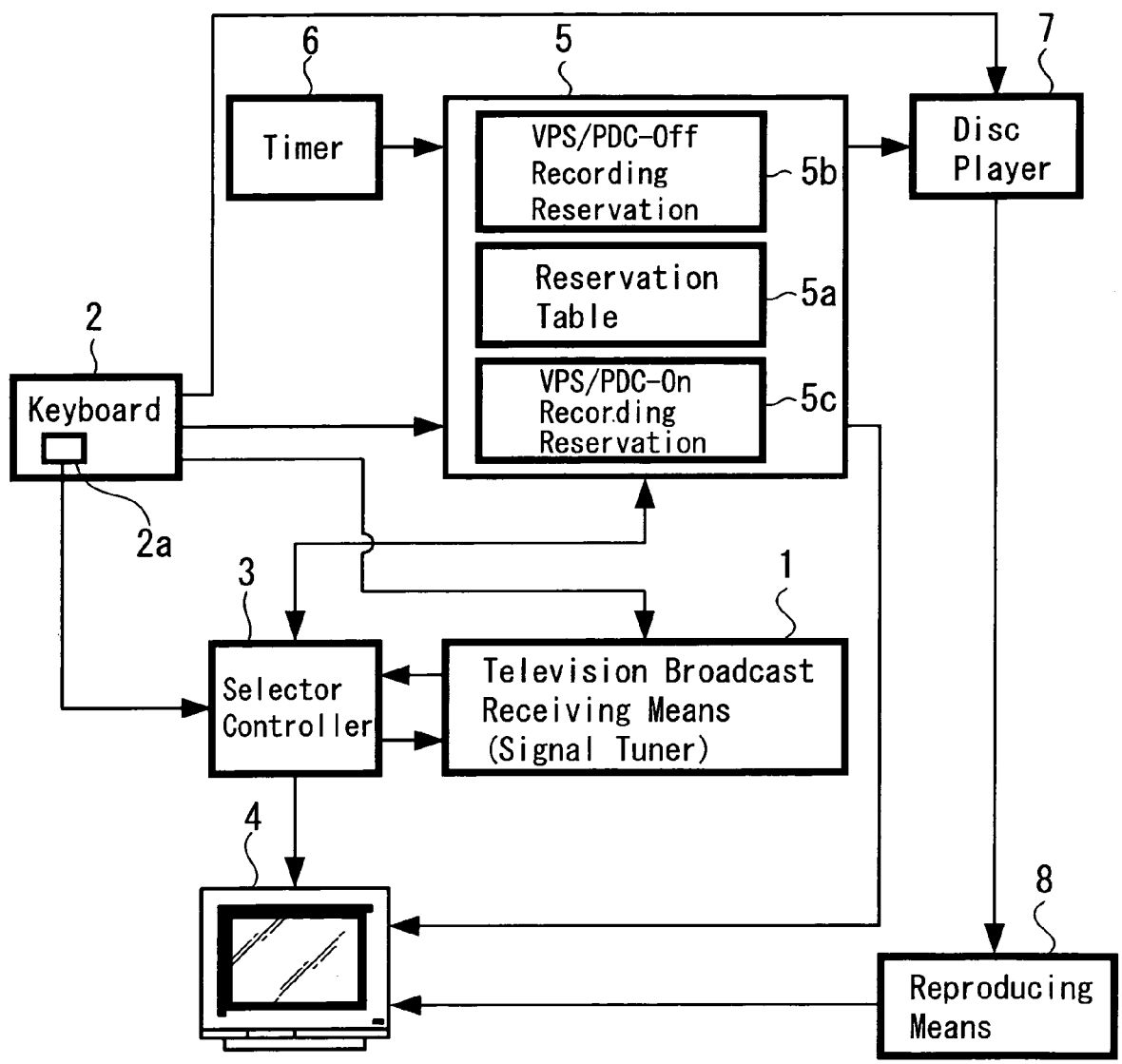
FIG. 1 is a constitutional diagram showing an exemplified embodiment of a television broadcast signal receiving apparatus according to the present invention.
Figure 2:
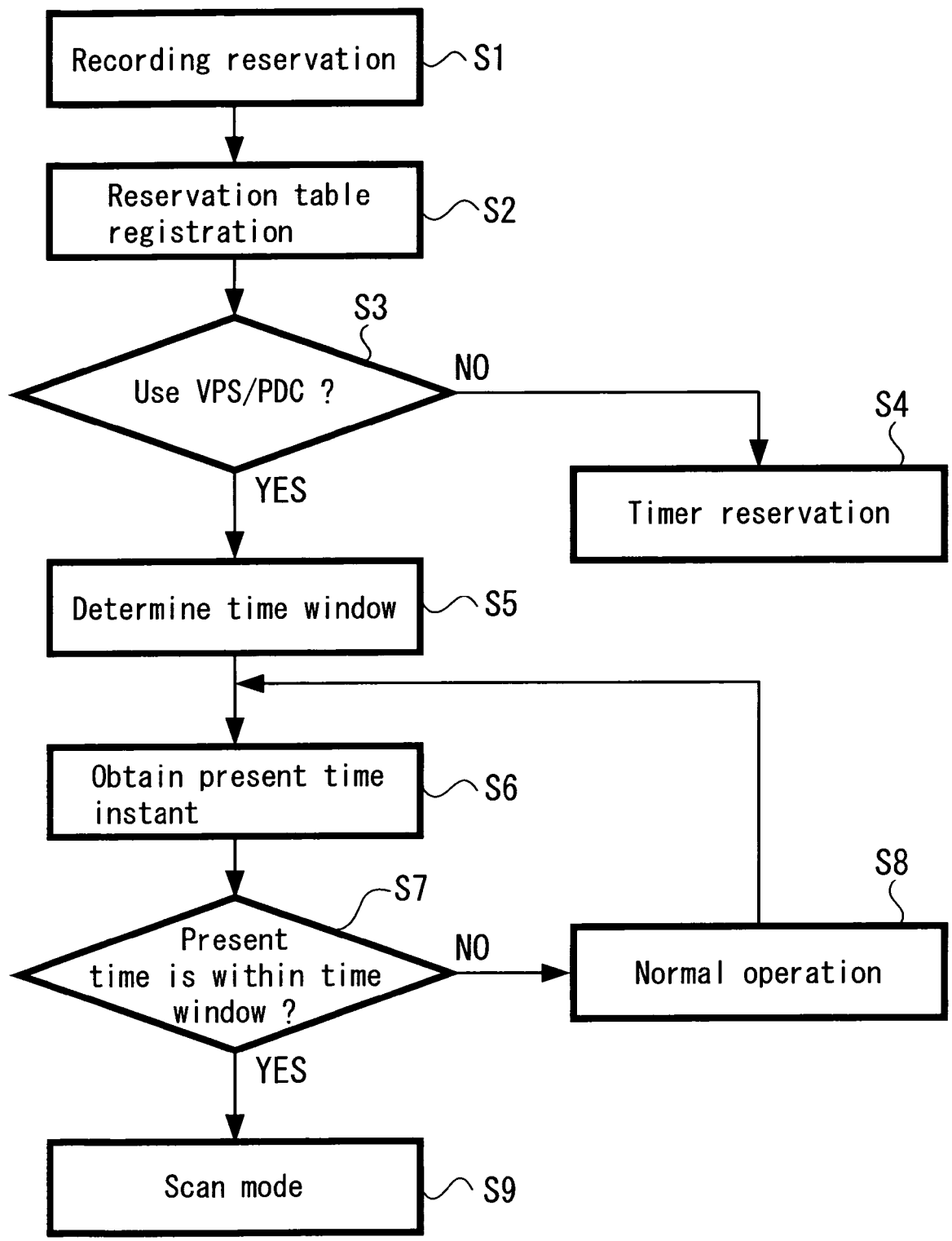
FIG. 2 is a flowchart to be used for the explanation of the present invention.

In FIG. 1, 1 designates television broadcast receiving means which makes it possible to receive a television broadcast signal and the television broadcast receiving means 1 has one tuner, that is, a single tuner constitution, and it is constituted such that a television broadcast signal superimposed with a broadcast start time as teletext data (VPS/PDC signal) which are used centering on Europe can be received.

The VPS/PDC signal which is broadcast start time information is superimposed in every field of a television broadcast signal and even if the recording reserved program of the television broadcast is shifted for its broadcast start time depending on some sort of causes such as a special newscast, it is possible to record an aimed program when recording by reservation using this VPS/PDC signal, because the recording is carried out in dependence upon the broadcast start time of this VPS/PDC signal.

It is constituted such that the television broadcast receiving means 1 can receive a desired channel by a key operation of a keyboard 2 (remote commander or the like is also available) and at the same time, such that a television broadcast signal of a desired channel received by the television receiving means 1 is to be supplied to a monitor 4 by way of a selector controller 3 which will be described later on, and it is constituted such that the received television broadcast signal can be viewed on the monitor 4.

In FIG. 1, 5 designates recording reservation control means and the recording reservation control means 5 consists of a microcomputer or the like and includes a reservation table 5a, VPS/PDC-OFF recording reservation control means 5b and VPS/PDC-ON recording reservation control means 5c.

The reservation table 5a is constituted when a user carries out a recording reservation by using the keyboard such that the content of the recording reservation, for example, reservation time, information that the VPS/PDC signal is to be used (VPS/PDC-ON recording reservation), information that the VPS/PDC signal is not to be used (VPS/PDC-OFF recording reservation) or the like is to be registered therein.

The VPS/PDC-OFF recording reservation control means 5b is means for controlling the recording reservation which does not use the VPS/PDC signal, and it manages time from a timer 6 and supplies the television broadcast signal of the reserved channel, for example, channel 6 received by the television broadcast receiving means 1 to a disc player 7 by way of the selector controller 3 and the recording reservation control means 5 when it becomes the reserved time, and it is controlled in the disc player 7 such that the television broadcast signal is to be recorded on a disc thereof.

Also, the VPS/PDC-ON recording reservation control means 5c is means for controlling the recording reservation which uses the VPS/PDC signal. The VPS/PDC-ON recording reservation control means 5c determines a time window depending on a predetermined promise when a recording reservation using the VPS/PDC signal is carried out.

When, for example, a reservation starting from 0:00 until 3:59 on March 24 is registered on the reservation table 5a as the recording reservation using the VPS/PDC signal, the time window is from 20:00 on March 23 until 4:00 on March 25.

Also, when, for example, a reservation starting from 4:00 until 23:59 on March 24 is registered on the reservation table 5a as the recording reservation, the time window is from 0:00 on March 24 until 4:00 on March 25.

The VPS/PDC-ON recording reservation control means 5c carries out a channel selection of the reservation object channel, for example, channel 6 (channel scan) at every predetermined time within the time window period in the television broadcast receiving means, obtains the VPS/PDC signal superimposed in the television broadcast signal by way of the selector controller 3 and manages thereof, and when the VPS/PDC signal becomes the recording reservation time, it supplies the television broadcast signal of the reserved channel, for example, channel 6 received by the television broadcast receiving means 1 to the disc player 7 by way of the selector controller 3 and the recording reservation control means 5 and controls such that the television broadcast signal is to be recorded on a disc in the disc player 7.

According to the present invention, the VPS/PDC-ON recording reservation control means 5c transmits a display signal to the monitor 4 during a period in which the channel selection of the reservation object channel of the time window period (channel scan) is carried out and it is constituted such that a display of "Now is in a channel scan. Please execute 'Scan Off' in order to watch a program." is to be displayed on the screen of the monitor 4.

Also, according to the present invention, a scan off 'Scan Off' key 2a is provided in the keyboard 2 such that when the scan off key 2a is operated, the selector controller 3 is controlled, the television broadcast signal received by the television broadcast receiving means 1 is supplied to the monitor 4 and the television broadcast signal can be viewed on the monitor 4. In this case, the television broadcast receiving means 1 can channel-select an arbitrary channel by the keyboard 2.

When the scan off key 2a is operated, the recording reservation control means 5 becomes a state for the VPS/PDC-OFF recording reservation which does not use the VPS/PDC signal.

In the example of FIG. 1, furthermore, reproduction of the disc player 7 can be controlled by the keyboard 2. When the disc player 7 is made to be a reproducing state, a reproduced signal from the disc player 7 is supplied to the monitor 4 through a reproducing means 8 and it is constituted such that the reproduced signal is to be viewed on the monitor 4. Others in the television broadcast signal receiving apparatus in the example of FIG. 1 are constituted similarly as those of a conventional apparatus.

Next, it will be explained with respect to the operation of the recording reservation of the television broadcast receiving apparatus in the example of FIG. 1 by using the flowcharts shown in FIG. 2 and FIG. 3.

When a recording reservation is carried out by the keyboard 2 (step S1), the content of the recording reservation is registered on the reservation table 5a of the recording reservation control means 5 (step S2).

Next, it is judged by the content of the recording reservation whether or not the VPS/PDC signal is to be used (step S3) and when it is a recording reservation which does not use the VPS/PDC signal, the timer 6 is managed by using the VPS/PDC-OFF recording reservation control means 5b such that the recording is carried out by the timer reservation (step S4).

When it is a recording reservation which uses the VPS/PDC signal, a time window corresponding to the reservation time is determined (step S5). Thereafter, the present time instant is obtained (step S6) and it is judged whether or not the present time instant is within the time window which was determined in step S5 (step S7).

When the present time instant is not within the time window, the disc recorder carries out a normal operation (step S8) and the flow repeats the operations of these steps S6, S7 and S8.

Next, when the present time instant enters into the time window, the VPS/PDC-ON recording reservation control means 5c carries out channel selection of the reservation object channel, for example, channel 6 (channel scan) at every predetermined time in the television broadcast receiving means 1 and carries out management by obtaining the VPS/PDC signal superimposed to the television broadcast signal by way of the selector controller 3 (step S9).

Figure 3:
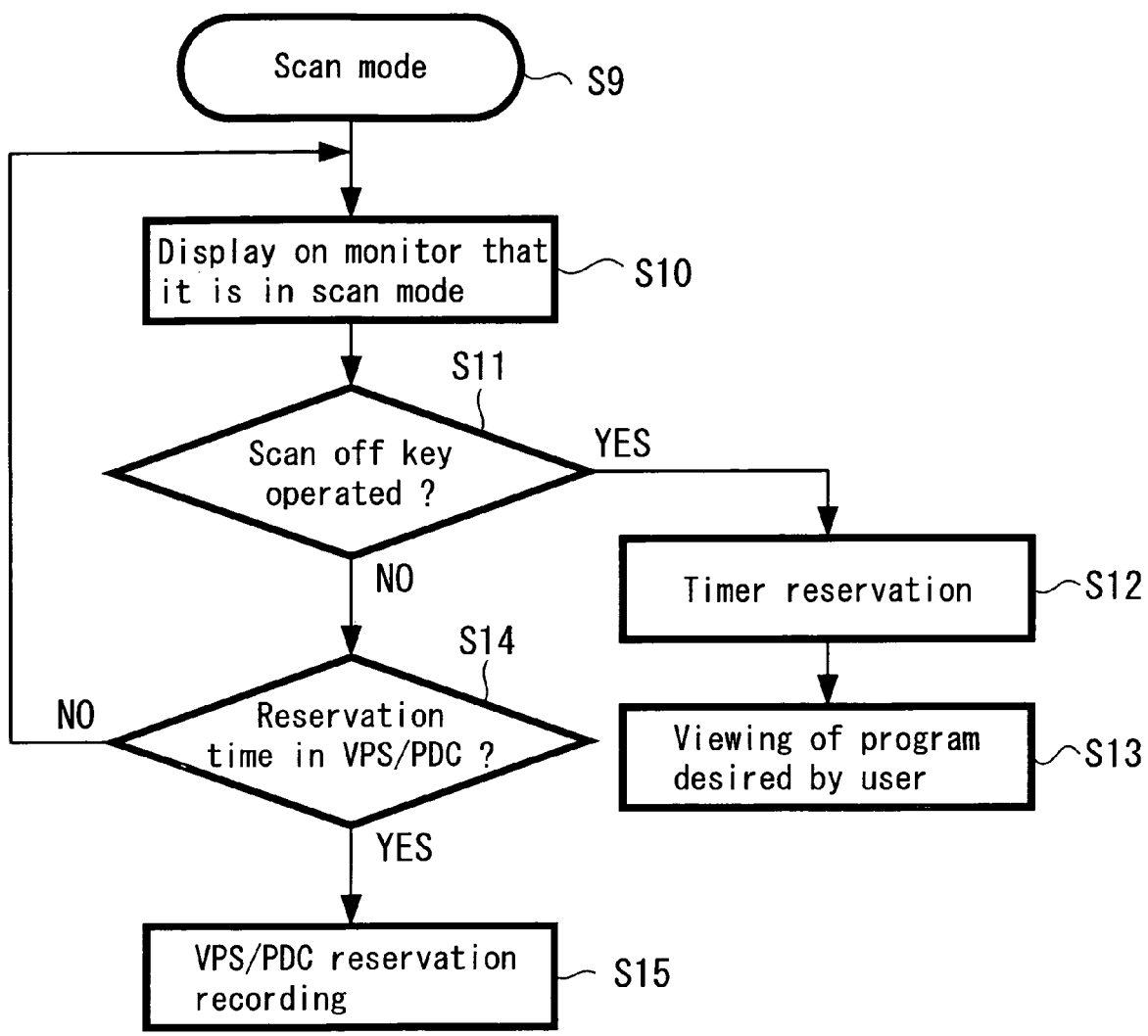
FIG. 3 is a flowchart to be used for the explanation of the present invention.

When it became the channel scan mode (step S9), as shown in FIG. 3, the VPS/PDC-ON recording reservation control means 5c displays as "Now is in a channel scan. Please execute 'Scan Off' in order to watch a program." on the screen of the monitor 4 (step S10).

Next, it is judged whether or not the scan off key 2a was operated (step S11). When a user comes to wish a program viewing of a desired channel, for example, channel 8, the scan off key 2a is operated and at that time, it becomes a timer reservation by the VPS/PDC-OFF recording reservation control means 5b (step S12) and at the same time, it is constituted such that the television broadcast signal of the user's desired channel, for example, channel 8 from the television broadcast receiving means 1 is to be supplied to the monitor 4 through the selector controller 3 and it is possible to view the program of the user's desired channel (step S13).

When the scan off key 2a is not operated in step S11, it is judged whether or not the VPS/PDC signal became the reservation time (step S14) and when the VPS/PDC signal does not become the reservation time, the flow returns to step S10, and when the VPS/PDC signal became the reservation time, the reservation recording using the VPS/PDC signal is executed.

Generally, a reservation recording using the VPS/PDC signal is registered and at the same time, a channel scan is carried out when the state is in the time window such that it is not possible to view a television broadcast program, but according to the present invention, there is provided a scan off key 2a for turning off the channel scan at that time and the channel scan is made to be turned off by the operation of the scan off key 2a, so that it is possible also at that time to view a television broadcast program of a desired channel in response to a user's demand.

It should be noted in the above mentioned examples that in case of being set to a scan off mode, the recording reservation control means 5 controls so as to carry out a recording just dependent on the time instant based on the timer 6, but this invention is not limited by this constitution and in case of being set to a scan off mode, it maybe constituted such that only the VPS/PDC OFF reservation recording is to be executed without carrying out the VPS/PDC ON reservation.

Also, in the above mentioned examples, the scan off key 2a was provided as channel scan off means for turning off the channel scan, but it is needless to say that other device such as a switch or the like can be used instead thereof.

Also, in the time window for channel-scanning the VPS/PDC signal according to the above mentioned examples, the extraction of the VPS/PDC signal was stopped by operating a predetermined scan off key 2a, but this invention is not limited by such a process. For example, it may be constituted such that the channel scan is to be stopped automatically in a case when it becomes the above mentioned time window on an occasion when viewing a television broadcast signal for which a channel selection instruction is inputted by the user (channel not multiplexed with VPS/PDC signal). In this regard, it may be constituted as a further preferable control such that warning information designating that the scan operation of the VPS/PDC signal is stopped is to be displayed.

Further, it may be constituted in the above mentioned time window such that the channel scan is stopped automatically in a case when a channel selection instruction of a channel which is not multiplexed with the VPS/PDC signal is inputted by a user and it may be constituted such that warning information designating that the scan operation of the VPS/PDC signal is stopped is to be displayed.

Also, it is needless to say that the present invention is not limited by the above mentioned examples and others various constitutions can be employed without departing from the scope of the present invention.

The invention claimed is:

1. A television broadcast signal receiving apparatus comprising:

receiving means for receiving a television broadcast signal multiplexed with teletext data;

channel scan means for automatically extracting said teletext data from a television broadcast signal in a predetermined time window; and input means for accepting a selection instruction input of the television broadcast signal from a user, wherein it is constituted such that said channel scan means judges according to said selection instruction input whether or not the extraction of said teletext data is to be stopped in said time window.

2. A television broadcast signal receiving apparatus according to claim 1, wherein said channel scan means is constituted such that the extraction of said teletext data is stopped in a case when there was a selection instruction input for selecting a television broadcast signal other than a television broadcast signal multiplexed with teletext data.

3. A television broadcast signal receiving apparatus according to claim 2, wherein said channel scan means includes display means for displaying information which confirms the stoppage of the teletext data extraction in a case when there was a selection instruction input for selecting a television broadcast signal other than a television broadcast signal multiplexed with teletext data in said time window.

4. A television broadcast signal receiving apparatus according to claim 1, wherein said teletext data includes data designating broadcasting time of a program which is included in said television broadcast signal and the apparatus is constituted such that it further includes recording reservation control means for carrying out an automatic recording of said program by controlling said receiving means according to said teletext data and recording reservation information which is set by a user.

5. A television broadcast signal receiving apparatus according to claim 1, wherein said receiving means includes one tuner and it is constituted such that a single television broadcast signal can be received.

\* \* \* \* \*

UNITED STATES PATENT AND TRADEMARK OFFICE
CERTIFICATE OF CORRECTION

| | |
|---|---|
| PATENT NO. | : 7,496,276 B2 |
| APPLICATION NO. | : 10/552256 |
| DATED | : February 24, 2009 |
| INVENTOR(S) | : Hideyuki Ota |

It is certified that error appears in the above-identified patent and that said Letters Patent is hereby corrected as shown below:

On the Title page Add:

Item
--(30)    Foreign Application Priority Data

April 7, 2003    JP    2003-103259.--

Signed and Sealed this

Twenty-first Day of April, 2009

JOHN DOLL
*Acting Director of the United States Patent and Trademark Office*